United States Patent [19]

Portman

[11] 4,183,291
[45] Jan. 15, 1980

[54] HICKORY WOOD COOKING PLANK

[76] Inventor: Homer F. Portman, 1057 Hillsboro Mile, Pompano Beach, Fla. 33062

[21] Appl. No.: 776,929

[22] Filed: Mar. 11, 1977

[51] Int. Cl.² .......................... A47J 37/01; A47J 37/04
[52] U.S. Cl. ........................................ 99/425; 99/445; 99/448; 99/449
[58] Field of Search .......... 99/425, 467, 422, 444–446, 99/400, 408, 375, 448, 449; 108/114, 157, 51.1, 54.1, 56.3

[56] References Cited

U.S. PATENT DOCUMENTS

| 764,497 | 7/1904 | Overton | 99/425 |
|---|---|---|---|
| 2,198,647 | 4/1940 | Wolcott | 99/425 |
| 2,229,518 | 1/1941 | Parker | 99/425 |
| 3,211,082 | 10/1965 | Sachnoff | 99/444 |
| 3,427,955 | 2/1969 | Menzin | 99/425 |
| 3,831,002 | 8/1974 | Mysicka | 99/425 |

Primary Examiner—Harvey C. Hornsby
Assistant Examiner—Timothy F. Simone
Attorney, Agent, or Firm—Snider, Sterne & Saidman

[57] ABSTRACT

A hickory wood cooking plank for broiling or baking meats, fish, poultry and the like, in conventional home ovens. The design features a unique, aluminum support stand provided in the form of a pair of L-shaped aluminum elements which are adapted to be respectively fitted within a pair of longitudinally extending grooves inwardly formed on the side edges of the cooking plank. The aluminum stand serves the dual function of supporting the cooking plank and dissipating the heat from the plank to prolong useful life. This permits high temperature broiling in a conventional oven to char the hickory plank which, in turn, imparts a hickory flavor to the food placed thereon for cooking.

9 Claims, 3 Drawing Figures

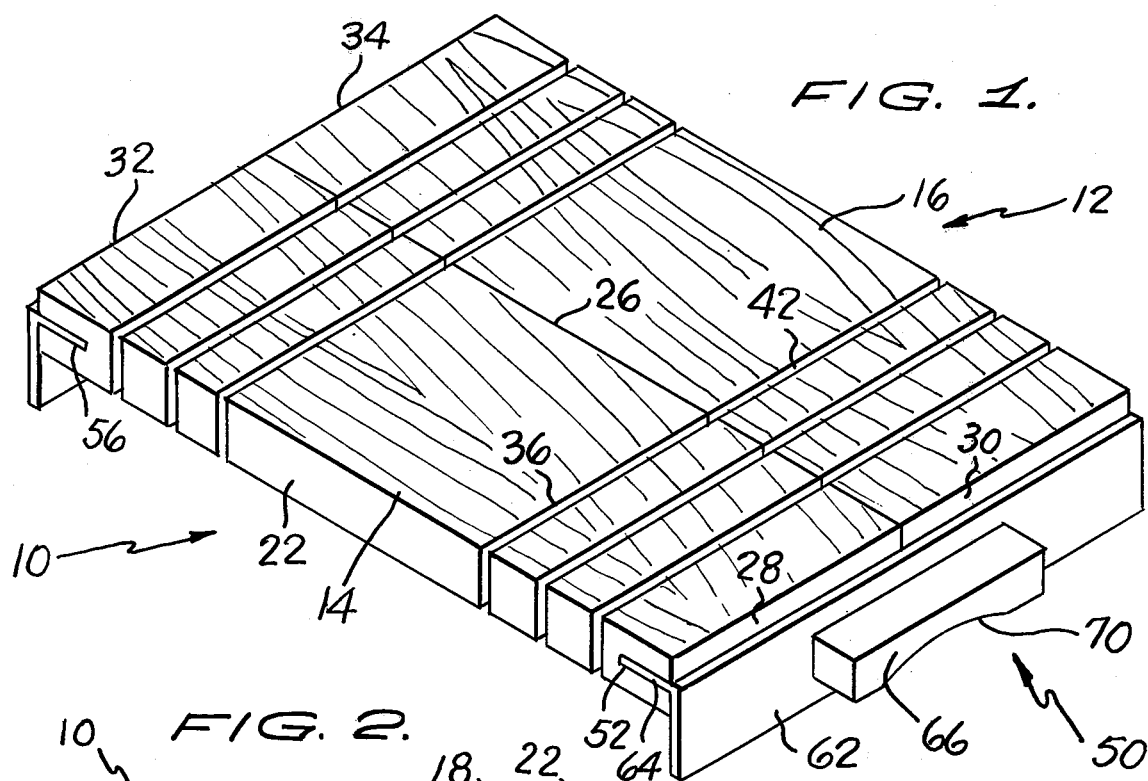
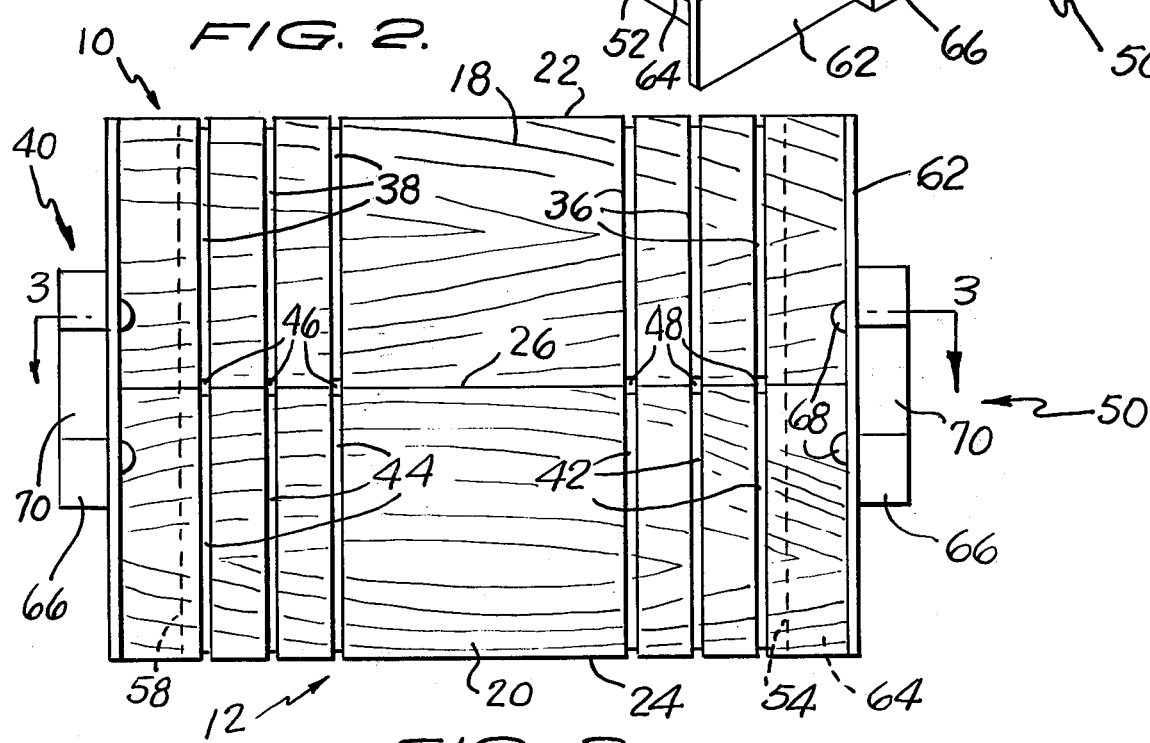
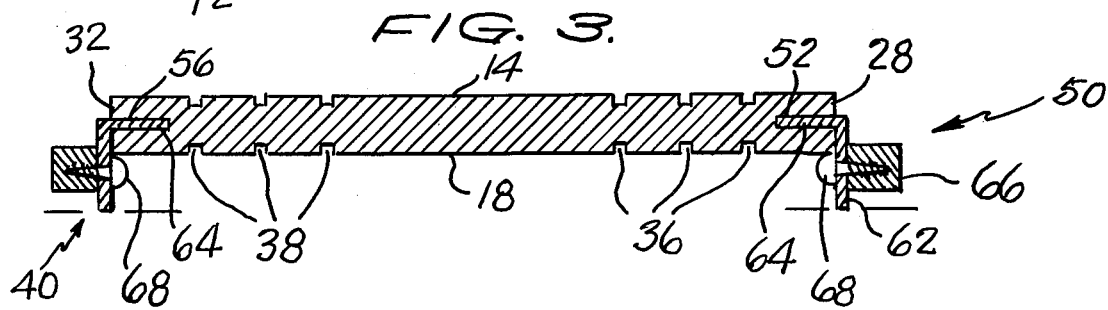

HICKORY WOOD COOKING PLANK

BACKGROUND OF THE INVENTION

1. FIELD OF THE INVENTION

This invention is related to cooking utensils and, more particularly, is directed towards a cooking plank intended for use in conventional home kitchen gas or electric ovens.

2. DESCRIPTION OF THE PRIOR ART

It is possible to cook fish, meat and/or poultry directly on a wooden plank for transferring a particular flavor from the wood to the food being cooked. Typical prior art patents of which I am aware which illustrate devices of this general nature include Kaufman's U.S. Pat. No. 2,423,963, and Overton's U.S. Pat. No. 764,496. However, I have found that each of the structures set forth in these references are deficient in one or more respects.

For example, the first-named patent to Kaufman illustrates the utilization of a thin veneer sheet of wood with which the meat to be cooked is in direct contact. While suggesting in Column 6, line 69, et seq. that the veneer sheet may be made of hickory wood, the structure taught is nevertheless extremely fragile, and no doubt would not be reuseable on a repeated or extended basis. It also appears that the Kaufman structure is unduly complex, non-portable, expensive to manufacture and produce, and therefore relatively unattractive to the consuming public.

Generally speaking, it may therefore be appreciated that desirable attributes of cooking planks are that they be easy to manufacture, portable, lightweight, durable, and do not require any special tools for assembly or disassembly. It is towards the foregoing that the present invention has been advanced.

OBJECTS AND SUMMARY OF THE INVENTION

It is therefore a primary object of the present invention to provide a hickory wood cooking plank which overcomes all of the deficiencies noted above with respect to prior art designs.

Another object of the present invention is to provide a hickory wood cooking plank which is inexpensive to manufacture, portable and lightweight, extremely durable to permit repeated quality use, and which does not require any tools for assembly or disassembly.

A further object of the present invention is to provide a hickory wood cooking plank which may be easily knocked down for packaging, storage, or transport, and which may be easily assembled in a matter of seconds by an average individual without requiring any tools.

An additional object of the present invention is to provide a hickory wood cooking plank which imparts a hickory flavor to the food being cooked thereon, and which includes unique means for dissipating the heat from the plank to prevent brittleness and to promote the useful life of the cooking plank.

A still further object of the present invention is to provide a hickory wood cooking plank which includes means integrally formed therein for disposing of the juices created during cooking.

A still further object of the present invention is to provide a hickory wood cooking plank which imparts a hickory char flavor to foods placed thereon in a conventional home oven thereby obviating the need for messy charcoal broiling with concomitant dangerous flames.

An additional object of the present invention is to provide a hickory wood cooking plank which, by virtue of a unique elevated design and dual cooking surface availability, results in a far superior product which may be used many more times than those conventionally available.

The foregoing and other objects are attained in accordance with one aspect of the present invention through the provision of an oven cooking utensil which comprises a cooking plank made of hickory wood and having a substantially planar upper cooking surface upon which the food to be cooked is placed, means for supporting the cooking plank in a raised relationship to the oven surface, and means for dissipating heat from the cooking plank. The cooking plank preferably includes means intergrally formed therein for receiving and securing the supporting means and the heat dissipating means. In a preferred embodiment, the receiving and securing means preferably comprises a pair of support grooves formed in and extending inwardly from a pair of parallel vertical outer edges of the plank.

In accordance with other aspects of the present invention, the heat dissipating and supporting means for the cooking plank are each comprised of the same integrally formed L-shaped support element which is selectively installed into and removed from the pair of support grooves formed in the outer edges of the plank. The L-shaped support elements each include a planar elongated metal flange adapted to be received within the groove, and a planar elongated metal leg which extends integrally from the flange and is angled approximately 90° with respect thereto. Each of the L-shaped support elements are preferably formed of aluminum, and include a wooden handle to facilitate gripping of the cooking plank assembly.

In accordance with still other aspects of the present invention, the cooking plank includes means integrally formed therein for conveying cooking juices away from the upper cooking surface of the plank. The conveying means preferably comprises a plurality of grooves formed in the cooking plank, and the grooves preferably extend circumferentially about the upper, lower and side surfaces of the cooking plank.

In accordance with another aspect of the present invention, the cooking plank may be formed of two substantially identical plank halves which, during use, have vertical side edges which adjacently abut one another. In this form, each of the cooking plank halves have a plurality of juice-catching grooves circumferentially extending thereabout. The abutting grooves at the junction between the two cooking halves form a plurality of through apertures at the center line of the cooking plank, the apertures serving as means for conveying the cooking juices away from the upper cooking surface.

In accordance with yet another aspect of the present invention, the lower surface of each of the cooking planks is substantially identically formed with respect to the upper surface, such that the cooking plank may be reversed with respect to the installation of the aluminum support stands to permit double-sided usage of the plank which further promotes longevity.

BRIEF DESCRIPTION OF THE DRAWINGS

The foregoing and other objects, aspects, features, and attendant advantages of the present invention will become more fully appreciated when considered in connection with the following detailed description of the present invention considered in connection with the accompanying drawings, in which:

FIG. 1 is a perspective view which illustrates a preferred embodiment of the present invention in an assembled form;

FIG. 2 is a plan, bottom view of the preferred embodiment illustrated in FIG. 1; and FIG. 3 is a cross-sectional view of the preferred embodiment illustrated in FIGS. 1 and 2 and taken along line 3—3 of FIG. 2.

DETAILED DESCRIPTION OF THE PREFERRED EMBODIMENT

Referring now to the drawings, wherein like reference numerals indicate identical or corresponding parts throughout the several views, and more particularly to FIGS. 1 and 2 thereof, there is illustrated in perspective and bottom views a preferred embodiment of the hickory wood cooking plank of the present invention. The cooking plank is preferably formed from a pair of substantially identical, rectangularly shaped plank halves 10 and 12 which are completely separable before and after use to provide for easy packaging, handling, and storage. The overall dimension of the plank halves 10 and 12, when placed together, are preferably on the order of nine inches wide, twelve inches long, and three quarters of an inch thick.

Each plank half 10 and 12 includes an upper planar cooking surface 14 and 16, respectively, and a lower planar surface 18 and 20, respectively. The lower surfaces 18 and 20 are substantially identical to the upper surfaces 14 and 16 to permit the hickory wood cooking plank of the present invention to be reversed. That is to say, either the upper or lower surfaces may be utilized as the cooking surface, depending upon the manner of installation of the support stands and handles, to be described in more detail hereinafter.

Plank halves 10 and 12 include parallel longitudinal side surfaces which are indicated by reference numerals 22 and 24. Reference numeral 26 indicates the junction between the plank halves 10 and 12, said junction 26 consisting of planar adjacent mating surfaces. The transverse side surfaces of plank half 10 is indicated by reference numerals 28 and 32, while the transverse side surfaces of plank half 12 are indicated by reference numerals 30 and 34. After assembly, surfaces 28 and 30 are coplanar, as are surfaces 32 and 34.

Circumscribed about each plank half 10 and 12 are a series of grooves which serve to collect and dispose of juices which result from the cooking process. The preferred embodiment illustrated includes, on plank half 10, two groups 36 and 38 of three grooves each, and on plank 12, two groups 42 and 44 of three corresponding grooves each. As perhaps best illustrated in FIGS. 2 and 3, each of the grooves extends about all four sides of the associated plank which renders the latter completely reversible and serves to catch, guide and direct cooking juices from the cooking surfaces to a drip pan preferably positioned therebeneath.

As seen in FIG. 2, the junction 26 between plank halves 10 and 12 include a plurality of apertures 46 and 48 formed therein, which happen to be equal in number to the number of grooves formed in one plank half. Apertures 46 are formed by the juxtapositioning of grooves 38 and 44, while apertures 48 are formed by the juxtapositioning of grooves 36 and 42. The apertures 46 and 48 further serve as means for directing the cooking juices away from the upper cooking surfaces of the hickory wood cooking plank of the present invention.

Each plank half 10 and 12 also includes a pair of lateral grooves on opposite parallel side edges thereof. For example, plank half 10 has a lateral groove 52 which extends inwardly from lateral edge 28 and a corresponding groove 56 which extends inwardly from the opposed parallel side surface 32 of plank half 10. In a like fashion, formed in side surface 30 is a lateral groove 54 (FIG. 2), while groove 58 is formed in the opposed parallel side surface 34. The lateral grooves 52, 54, 56 and 58 extend substantially inwardly of the transverse sides 28, 30, 32 and 34 of plank halves 10 and 12 and serve in combination with heat dissipation and supporting means to be described below.

A pair of support members are indicated generally in FIGS. 1 through 3 by reference numerals 40 and 50. Each of the support members 40 and 50 are substantially identical and are comprised of an L-shaped stand which is preferably formed of the metal aluminum. Each of the L-shaped stands or support members includes a vertical leg 62 which serves the function of raising the cooking surface above the bottom floor or normal cooking surface of the oven. The elevation of the cooking plank halves 10 and 12 enhances the circulation of fragrant aromas both above and below the cooking surface.

Extending integrally from each of the vertical legs 62 is a horizontal flange 64 which is sized to fit within the lateral grooves 52, 54, 56 and 58 formed in the cooking planks 10 and 12. The vertical legs 62 preferably include a wooden handle 66 which may be mounted to the vertical portion 62 of support members 40 and 50 via retaining means, such as screws 68. The handle 66 may further be dome-shaped as at 70 to assist in the hand-gripping thereof.

The inwardly extending flanges 64 of the support members 40 and 50 serve to dissipate the heat from the central portion of the cooking plank halves 10 and 12 in a fashion which reduces the brittleness of the cooking plank and thereby prolongs its useful life.

In use, the hickory wood cooking plank of the present invention may be easily assembled by placing the flanges 64 of the support members 40 and 50 within the corresponding grooves 52, 54, 56 and 58 formed in the lateral edges of cooking plank halves 10 and 12. Insertion of the combination handle and support members 40 and 50, as indicated, will result in a structurally sound, unitary cooking plank with integrally formed juice-disposing and heat dissipating means. The plank of the present invention is preferably placed in the oven during preheating to permit the hickory wood to char, which thereby provides more hickory flavor to the food subsequently placed thereon. The meat, fish or poultry desired to be cooked is placed directly on the plank. Although it is preferable to drain the juices from the cooking surfaces of the present invention, they may be saved by placing conventional aluminum foil as a drip pan directly underneath the cooking plank while in use. The plank may also be utilized for baking as well as broiling. The thickness of the cooking planks provide outstanding durability in permitting repeated uses, even in the hottest of oven temperatures. As use progresses, the outside surface slowly char to actually enhance the flavor and aroma. The cooking plank assembly of the present invention clearly does not require any special tool for assembly, and may be either assembled or disassembled easily and quickly. The heat dissipating handles provide longer life for the unit, while elevating the cooking surfaces to enhance the flavor of the food by greater circulation of the aromas.

Obviously, numerous modifications and variations of the present invention are possible in light of the above teachings. It is therefore to be understood that within the scope of the appended claims, the invention may be practiced otherwise than as specifically described herein.

I claim as my invention:

1. An oven cooking utensil, which comprises:
   a cooking plank made of hickory wood and having a substantially planar upper cooking surface upon which the food to be cooked is placed, a lower surface and a pair of substantially parallel, vertical planar side surfaces extending perpendicularly from opposite sides of said upper cooking surface to said lower surface;
   means for supporting said cooking plank in a raised relationship to the oven surface and said means for supporting also providing means for dissipating heat from said cooking plank; and
   a pair of substantially planar support grooves formed along substantially the entire length of and extending inwardly from said pair of parallel vertical side surfaces of said plank and being substantially parallel to said upper cooking surface for frictionally receiving and securing said support means and said heat dissipating means;
   said heat dissipating means and said supporting means comprising a pair of L-shaped aluminum support elements each comprising a planar elongated flange adapted to be received within one of said pair of support grooves and a planar elongated leg which integrally extends from said flange.

2. The oven cooking utensil as set forth in claim 1, wherein said supporting means and said heat dissipating means are each comprised of the same integrally formed element.

3. An oven cooking utensil as set forth in claim 1, further comprising wooden handle means connected to each of said L-shaped support elements.

4. An oven cooking utensil as set forth in claim 1, wherein said cooking plank includes means integrally formed therein for conveying cooking juices away from said upper cooking surface.

5. An oven cooking utensil as set forth in claim 4, wherein said conveying means comprises a plurality of grooves formed in said cooking plank.

6. An oven cooking utensil as set forth in claim 1, wherein said cooking plank is formed of two substantially identical plank halves which, in use, have vertical side edges adjacent one another.

7. An oven cooking utensil as set forth in claim 6, wherein each of said cookinng plank halves have a plurality of juice-catching grooves circumferentially extending thereabout.

8. An oven cooking utensil as set forth in claim 7, further comprising a plurality of apertures located at the junction between adjacent halves of said cooking plank in use, said apertures serving as means for conveying cooking juices away from said upper cooking surface.

9. An oven cooking utensil as set forth in claim 1, wherein said cooking plank lower surface is substantially identical to said upper surface and capable of serving as a cooking surface upon reversing the position of said cooking plank.

* * * * *